F. PUENING.
PROCESS AND APPARATUS FOR COKING PITCH.
APPLICATION FILED JAN. 12, 1918.
1,392,879.
Patented Oct. 4, 1921.
11 SHEETS—SHEET 1.
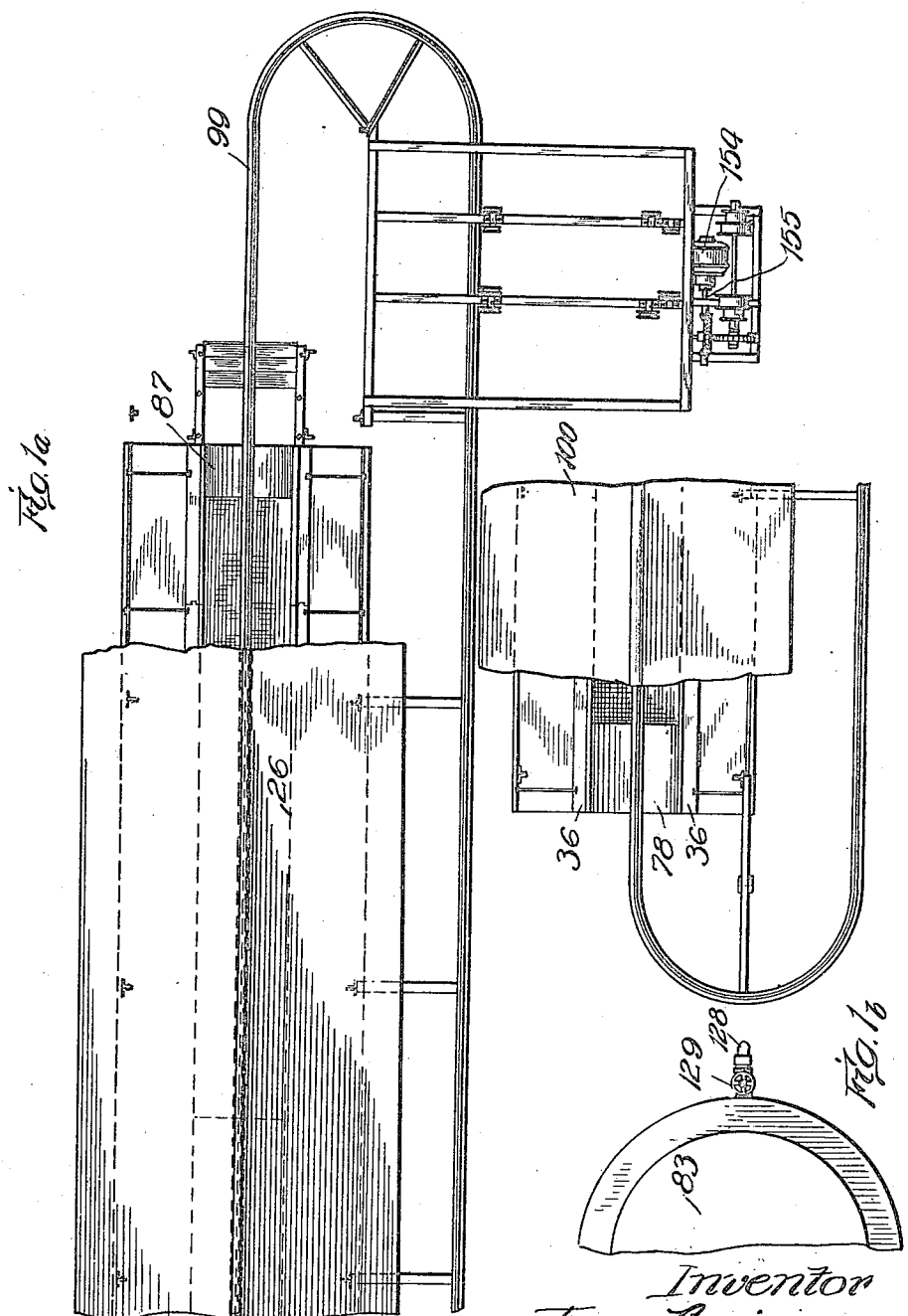

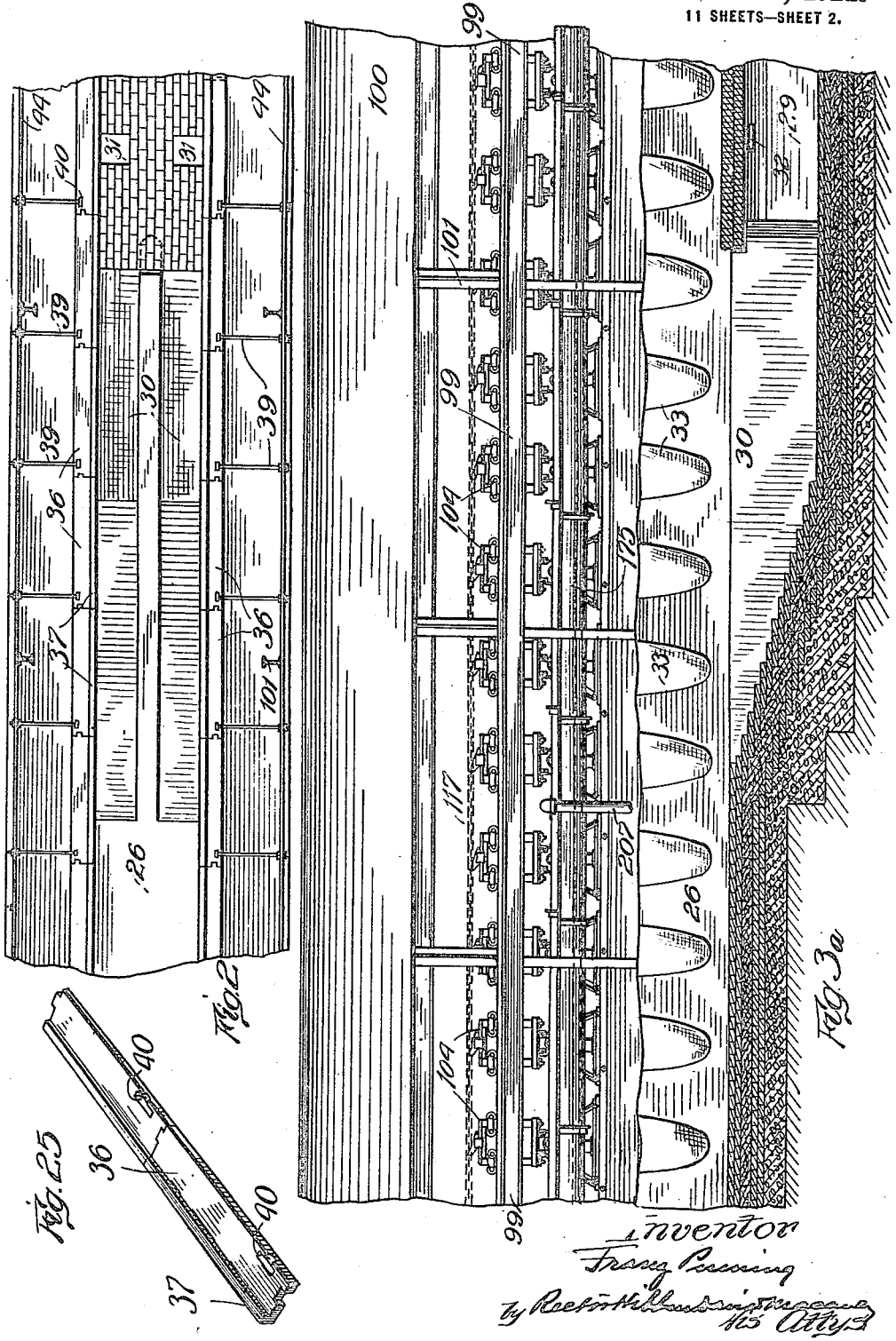

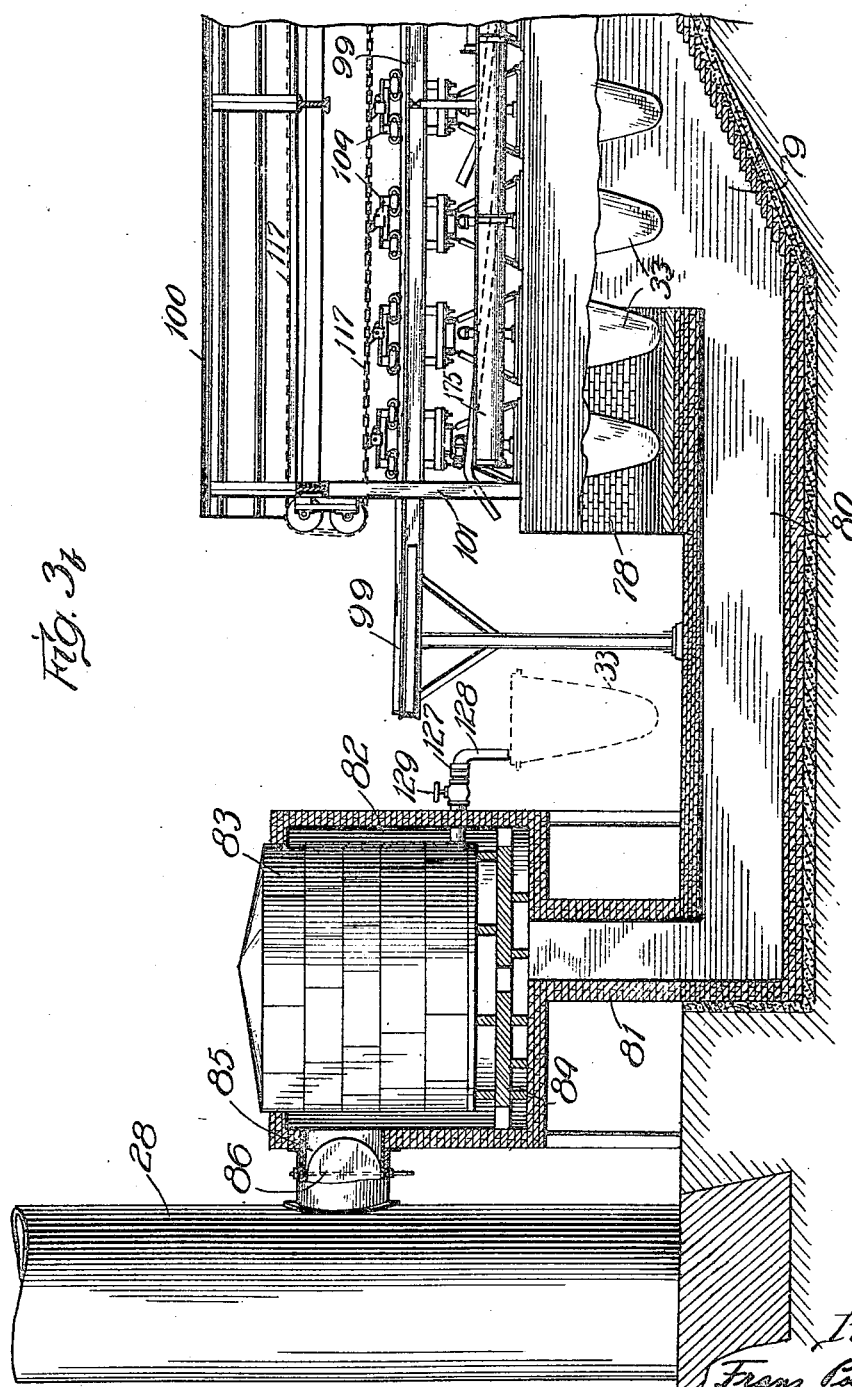

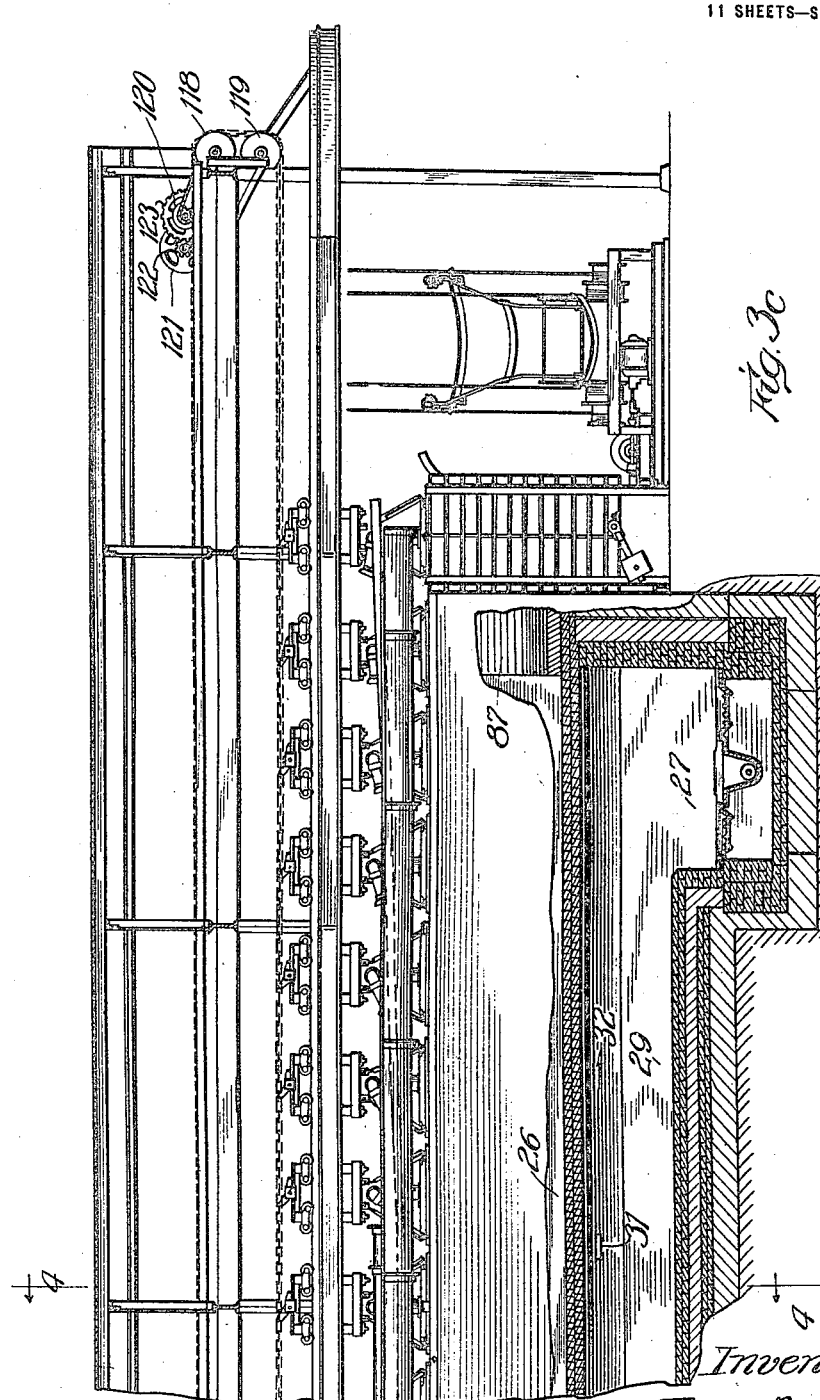

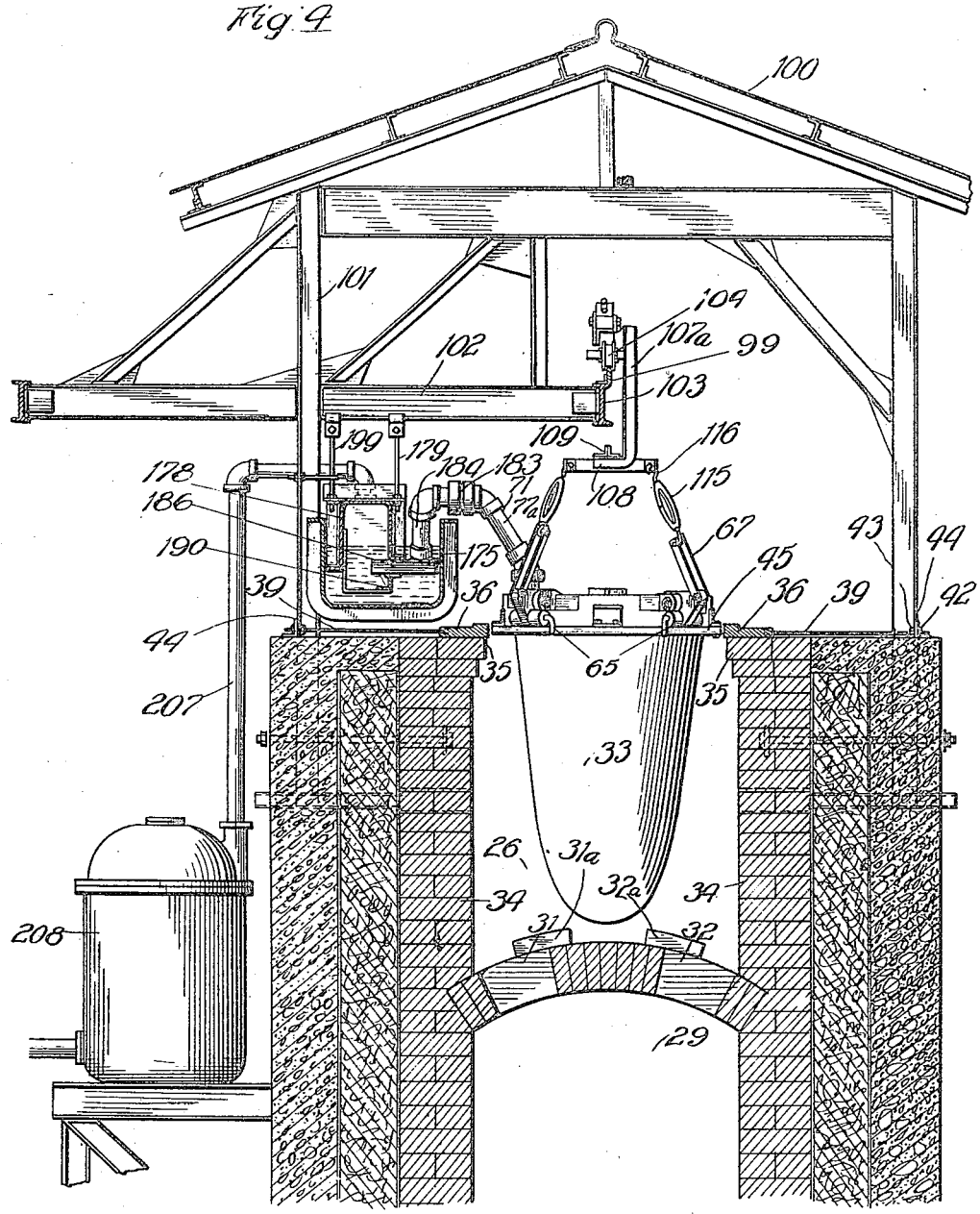

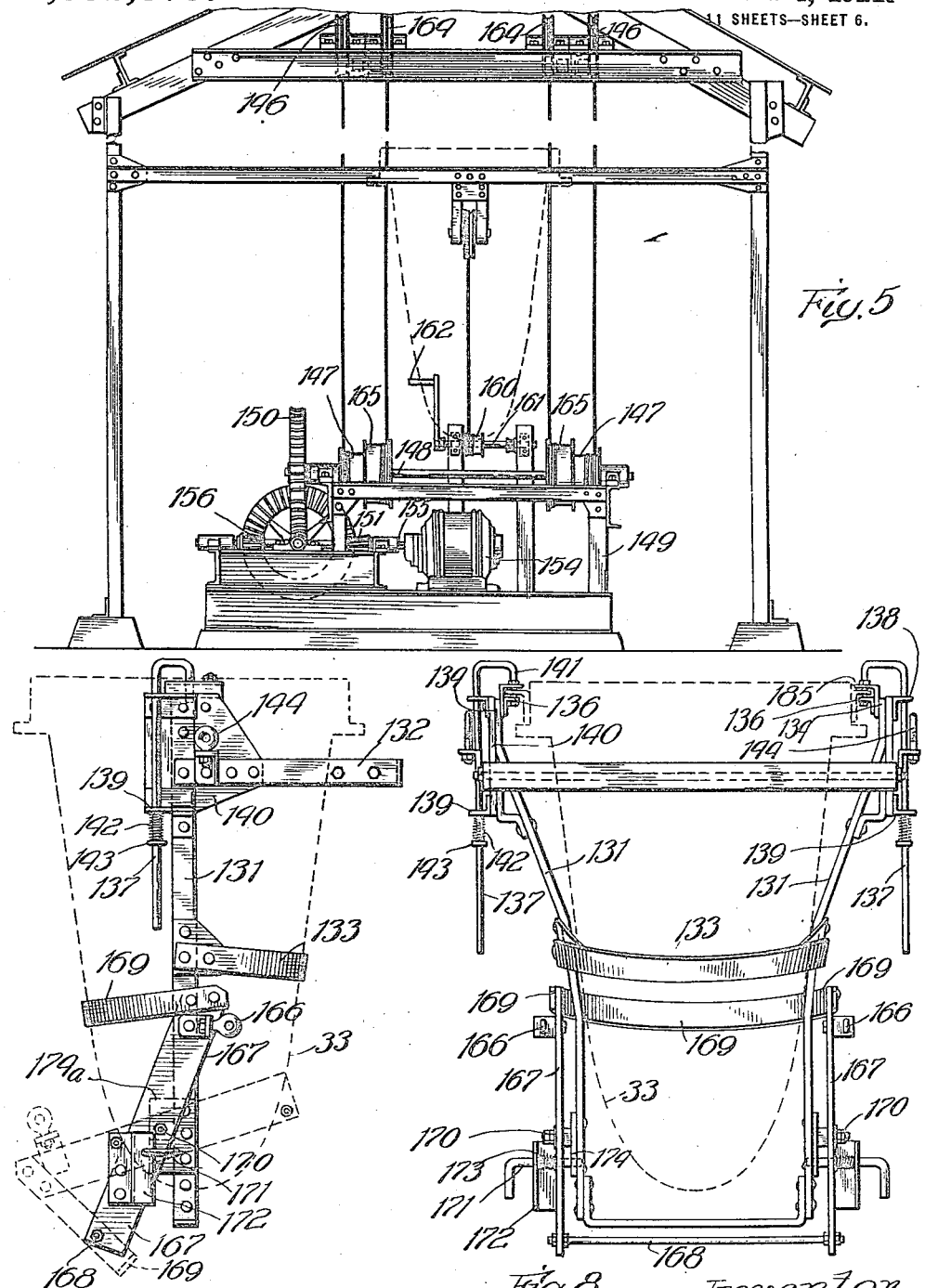

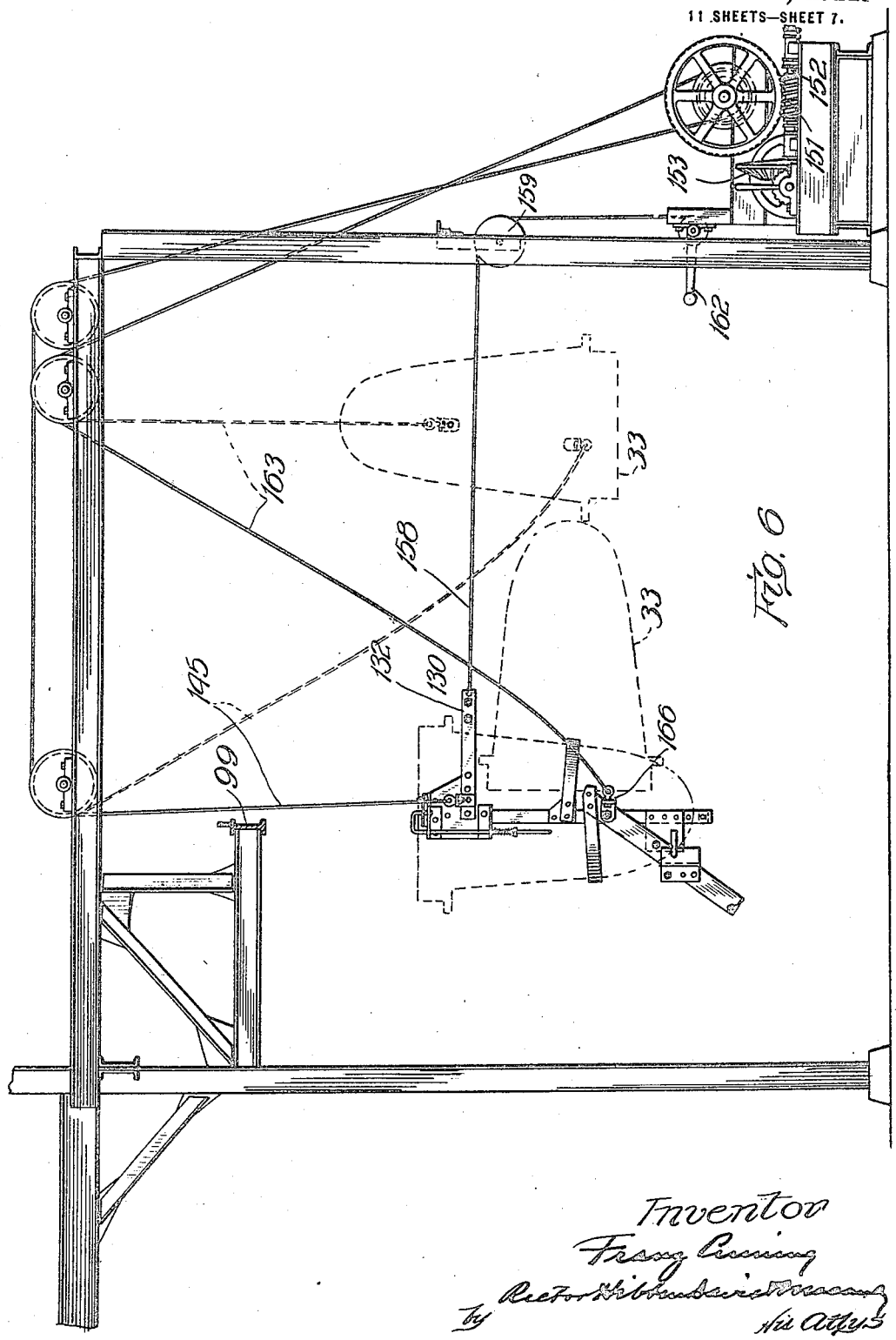

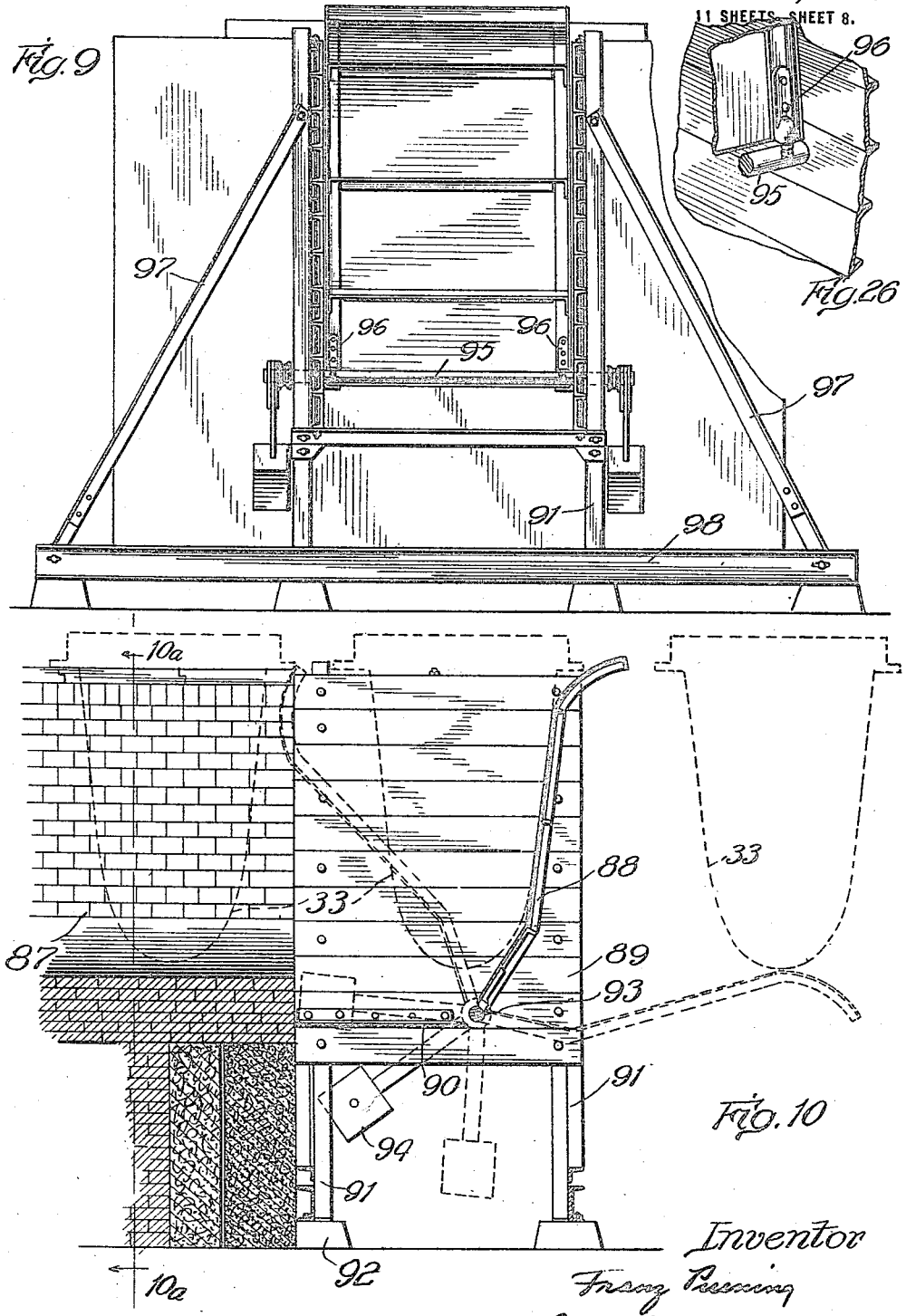

F. PUENING.
PROCESS AND APPARATUS FOR COKING PITCH.
APPLICATION FILED JAN. 12, 1918.
1,392,879. Patented Oct. 4, 1921.
11 SHEETS—SHEET 9.
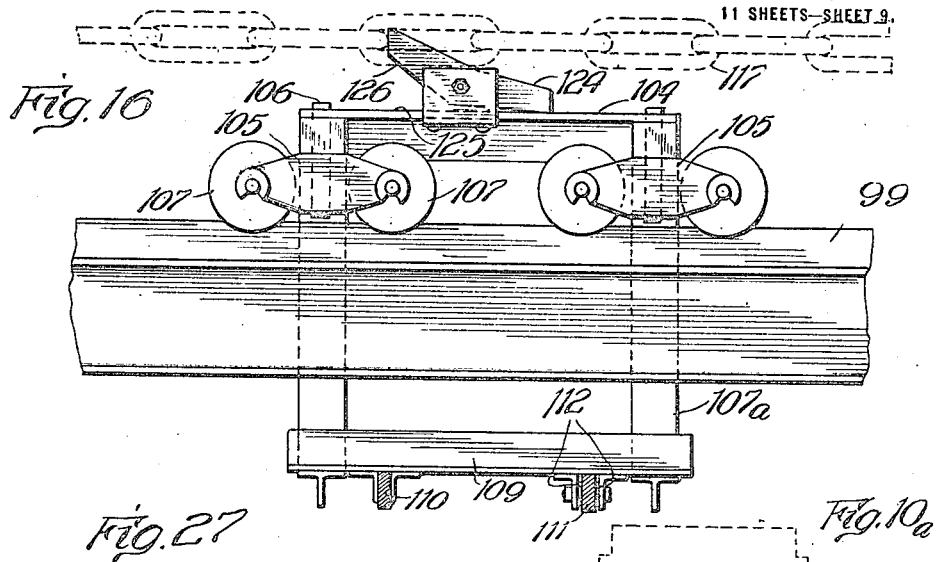
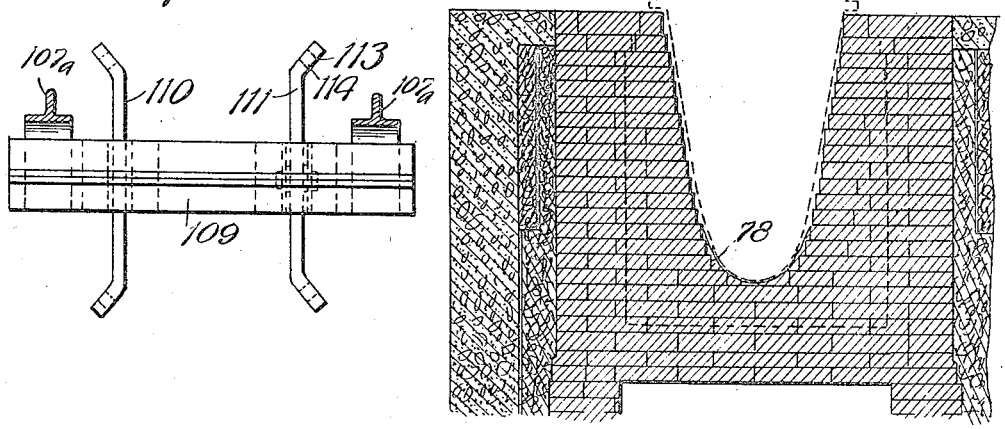
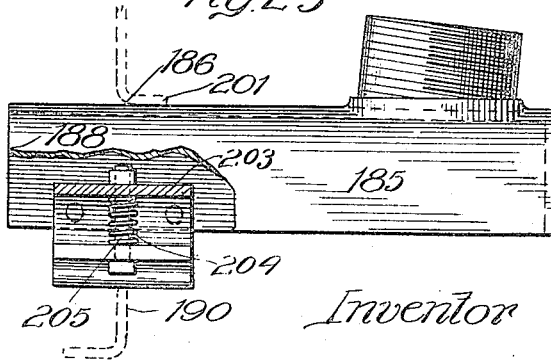
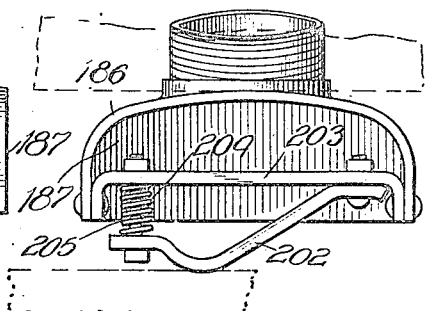
Inventor
Franz Puening,
by Rector Hibben Davis & Macauley
his Attys

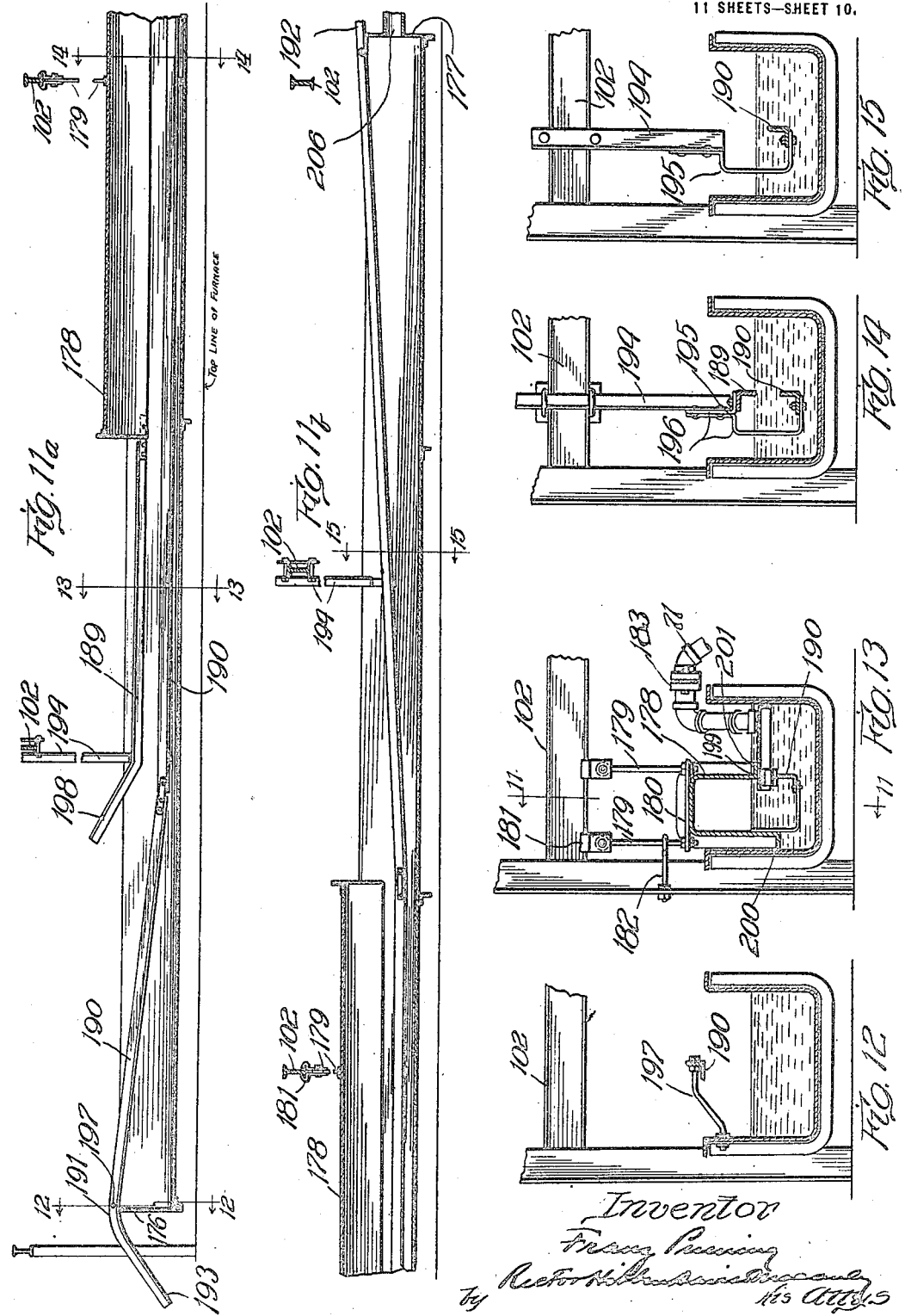

F. PUENING.
PROCESS AND APPARATUS FOR COKING PITCH.
APPLICATION FILED JAN. 12, 1918.
1,392,879.
Patented Oct. 4, 1921.
11 SHEETS—SHEET 11.
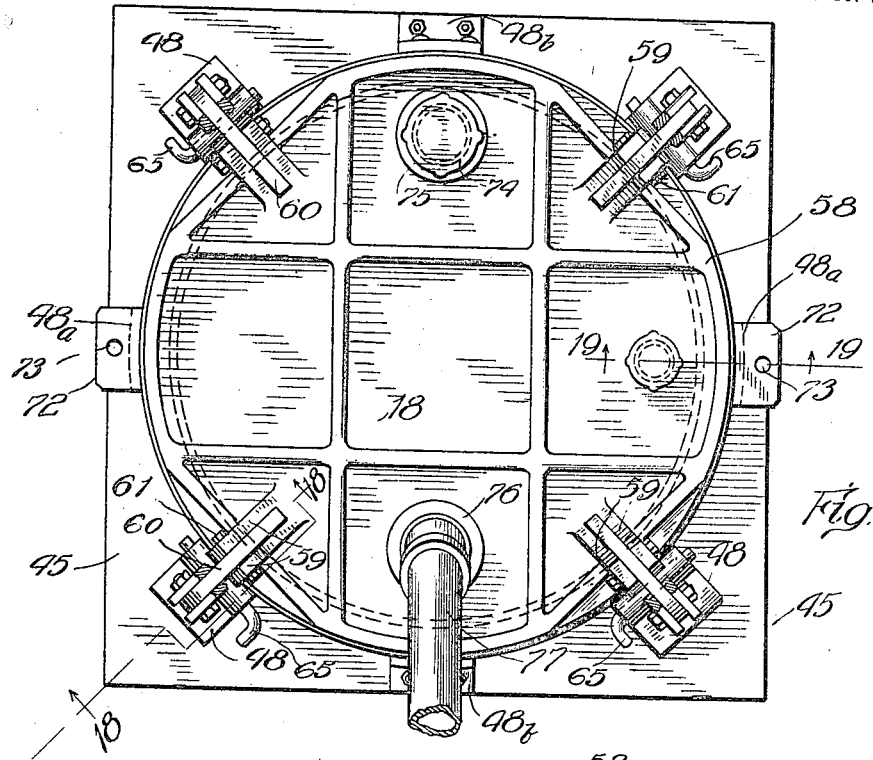
Fig. 17
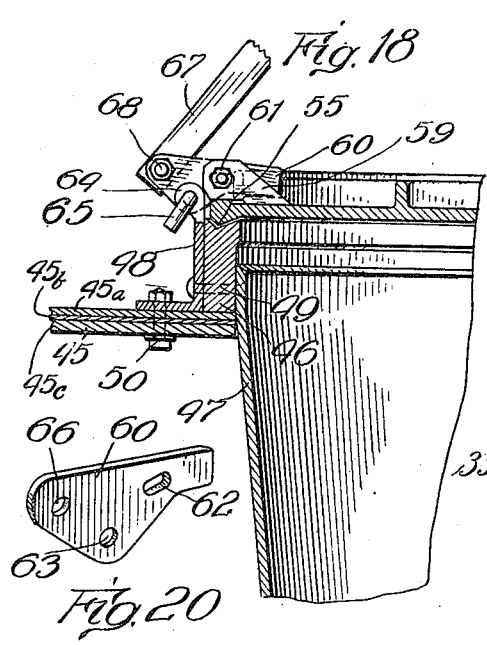
Fig. 18
Fig. 20
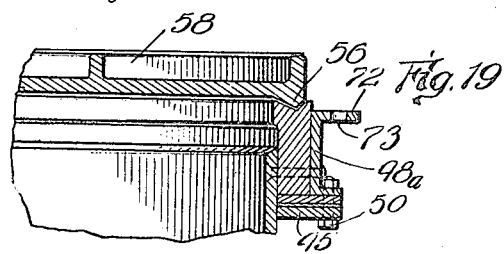
Fig. 19
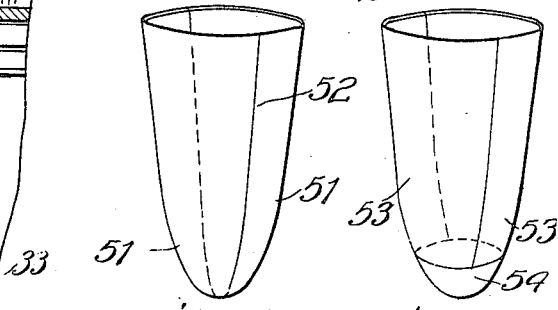
Fig. 21  Fig. 22
Inventor
Franz Puening
by Reed, Hibben, Davis Macaulay
His Attys

UNITED STATES PATENT OFFICE.

FRANZ PUENING, OF CHICAGO, ILLINOIS, ASSIGNOR TO AMERICAN TAR PRODUCTS COMPANY, OF CHICAGO, ILLINOIS, A CORPORATION OF DELAWARE.

PROCESS AND APPARATUS FOR COKING PITCH.

1,392,879.     Specification of Letters Patent.     Patented Oct. 4, 1921.

Application filed January 12, 1918. Serial No. 211,546.

*To all whom it may concern:*

Be it known that I, FRANZ PUENING, a citizen of the United States, residing at Chicago, in the county of Cook and State of Illinois, have invented certain new and useful Improvements in Processes and Apparatus for Coking Pitch, of which the following is a specification.

My invention relates more particularly to the coking of coal tar pitch, though it is also applicable to the treatment of other similar liquid hydro-carbons and materials. Prior to my invention various efforts have been made to coke coal tar pitch, but with no commercial success. In the efforts heretofore made stationary retorts of large size have been employed and it has been customary to heat them to the high temperature required to make a good coke. Where such retorts have been made of cast iron they have shown a tendency to crack under the strain of expansion and contraction, due to the heat changes, and brick and fire clay retorts have been equally unsatisfactory because they leak and part of the charge is lost. Steel retorts in the practice heretofore attempted under the high temperatures quickly corrode and are destroyed. Moreover, when the pitch is heated in the furnaces and retorts heretofore used, there is a tendency to foam at a certain stage of the heating process, which can only be avoided by very careful firing. Furthermore, in such furnaces, because of the high temperature which has to be maintained toward the close of the coking operation, and for many hours previous thereto, there is a great waste of heat in hot stack gases. Also much time was lost in permitting the coke to cool down before removal from the retorts, and much labor was required for this operation.

In my improved process and apparatus the coking is carried out in a series of retorts or receptacles which are movable within the furnace and after being filled with the pitch to be coked, carried gradually from a point of relatively low heat near the stack of the furnace to a point of maximum heat adjacent the fire box, the heated gases from the latter being employed at a high temperature where the maximum temperature is required, and transmitting their heat to receptacles containing pitch at successively lower temperatures, finally heating the supply tank of pitch to keep it sufficiently liquid and escaping to the stack with but little of their heat. Thus by my improved process and apparatus I effect a great economy in fuel.

In the accompanying drawings I have disclosed a preferred form of apparatus for carrying out my process, and described the same in the following specification. It is to be understood, however, that the specific disclosure is for the purpose of exemplification only and that the scope of the invention is defined in the following claims, in which I have endeavored to distinguish it from the prior art, without, however, relinquishing or abandoning any portion or feature thereof.

Referring to the drawings, Figure 1$^a$ is a plan view, with parts broken away, of one end of a plant in which my invention is embodied; and Fig. 1$^b$ a similar view of the other extremity of the plant. Fig. 2 is a similar view on an enlarged scale of an intermediate portion of the plant. Fig. 3$^a$ is an elevation, partly in section, of substantially the same part of the plant shown in Fig. 2, and Fig. 3$^b$ a similar view of the end of the plant toward and including the stack; Fig. 3$^c$ is a vertical section similar to Figs. 3$^a$ and 3$^b$ of the fire-box end of the plant, and to the right of that portion thereof shown in Fig. 3$^a$; Fig. 4 is a transverse vertical section taken on the line 4—4 of Fig. 3$^c$; Fig. 5 is an enlarged end elevation; and Fig. 6, a side elevation of the same portion of the plant; Figs. 7 and 8 elevations at right angles to each other of the means for receiving and dumping the receptacles when the operation of coking is completed; Fig. 9 an end elevation on a large scale of the exit end of the furnace and Fig. 10 a vertical, longitudinal section of the same, with the pitch receptacles shown in dotted lines; Fig. 10$^a$ a transverse vertical section on line 10$^a$—10$^a$ of Fig. 10; Figs. 11$^a$ and 11$^b$ together represent a vertical longitudinal section on line 11—11 of Fig. 13—Fig. 11$^a$ showing the end of said apparatus near the entrance thereto, and Fig. 11$^b$ the exit end thereof; Fig. 12 is a vertical, transverse section on the line 12—12 of Fig. 11$^a$; Fig. 13 a similar section on the line 13—13 of Fig. 11$^a$, showing also the connection from one of said receptacles for delivering the volatile matters; Fig. 14 a similar section on the line 14—14 of Fig. 11ª and Fig. 15 a similar section on the line 15—15 of Fig. 11ᵇ; Fig. 16 a side elevation of a detail on an enlarged scale; Fig. 17 is a plan view of one of the pitch receptacles or retorts; Fig. 18 a vertical section of a detail thereof on the line 18—18 of Fig. 17; Fig. 19 a similar section on the line 19—19 of Fig. 17; Fig. 20 a perspective of a detail; Fig. 21 a perspective of a receptacle body on a reduced scale, and Fig. 22 a similar view of a modified form thereof; Figs. 23 and 24 a side elevation partly in section, and transverse section respectively of a detail; Fig. 25 a perspective of another detail; Fig. 26 a perspective of another detail; and Fig. 27 a plan of a detail partly in section.

Each part is identified by the same reference character wherever it occurs throughout the several views.

One of the main features of my invention is that the operation of the process is substantially continuous, so that it is not necessary to vary the temperature or firing of the furnace but it is maintained as nearly as possible the same as long as the furnace is in operation. As above stated the pitch during treatment is contained in a series of receptacles and the furnace is so arranged and designed that these receptacles may be traversed through the furnace from the stack end to the fire-box end, the pitch being submitted thereby to gradually increasing temperature until it is completely coked, when the receptacle containing the same is removed from the furnace and the coke dumped by mechanism which will be hereinafter described. During the coking operation the receptacles or retorts are covered and the matter volatilized is carried by a pipe into a conduit extending alongside the furnace from which the various products are recovered. The retorts are suspended from a continuous track along which they travel through the furnace and after dumping are returned to the entrance-end of the furnace and prior to again entering the same are charged with new batches of pitch.

With this general understanding of the construction, I will now describe the apparatus in detail. Referring more particularly to Figs. 1 to 4 inclusive, the furnace comprises a long flue or passage 26, along which the pitch retorts travel, having a fire-box 27 at one end thereof which communicates indirectly with the stack 28 at its other end. The fire-box proper 27 is located beneath the passage 26 and communicates therewith by means of a flue 29 extending some distance beneath the passage 26 and connecting therewith at its end 30 and also by means of some short connecting flues 31, 32 at suitable intervals so that the heat of the fire-box is distributed sufficiently to avoid undesirable concentration at any one portion of the passage. Flues 31, 32 may be controlled by brick dampers 31ª, 32ª to properly distribute the heat. The construction of fire-box and flue by which the products of combustion are fed to the pot-heating chamber or passage is such that, by properly conducting the firing, combustion is confined to the fire-box and main flue, only products of combustion in which no substantial amount of air or oxygen is intermingled being permitted to come in contact with the pots or receptacles whereby destruction of the latter by oxidation is greatly retarded or substantially prevented.

The furnace is constructed of usual materials such as fire-brick, brick and cement. The dimensions of the passage 26 depend upon the size of the retorts 33 to be used therein, it being necessary that the passage be made of a diameter sufficiently greater than that of the retorts to provide for the rearward passage of the gases about the latter. The fire-brick side walls 34, 34 of the passage project inwardly at their upper edges as at 35, 35 and are surmounted by adjustable iron or other plates 36, 36 (see Figs. 4 and 25) which plates are thickened at their inner edges 37 and may be adjusted toward and from the center of the passage by means of rods 39, 39 connected at suitable intervals in openings 40, 40 (see Fig. 25), spaced along said plates and provided with nuts 42, 43 on opposite sides of the stationary angle irons 44, extending parallel to said passage. The purpose of these plates 36, 36 is to form a close joint with flanges 45 secured to the upper portions or rims of the retorts or receptacles 33 and coacting with each other and with said plates to seal said passage, thus preventing the escape of the heated gases therefrom and access of air thereto.

Preferably the flanges 45 are square in plan and, as shown in Figs. 18 and 19 may be formed of a thickness of cast iron 45ª, a sheet of steel 45ᶜ and an intermediate layer of heat insulating material, and each flange is secured to an annulus 46 which is riveted to the upper edge of the body portion 47 of its respective receptacle. The annulus 46 is of thicker metal than the body of the pot or retort and the flange is secured thereto by L-shaped straps 48, 48ª, 48ᵇ through which certain rivets 49 connecting the annulus and the body portion of the receptacle are passed, said straps being secured to the flange by bolts 50.

As the pitch cokes it expands or crowds upward and advantage is taken of this fact to provide for the ready dumping of the pots after the coking is complete, the pots being made with this end in view of such a flare or taper that the upward movement of the material during coking carries it away slightly from the walls. As the pots are subjected to a high temperature while loaded, during the process, and would therefore, unless precaution were taken to the contrary, be apt to change shape so as to make it difficult to get the formed coke out of them, they are made of the shape shown more particularly in Figs. 21, 22, which is that they would tend to assume under such conditions of load and temperature. The bottom portions of the pots are rounded or approximately spherical, the curve diminishing higher and gradually merging into an elongated conical surface. This shape is therefore approximately that of a catenary in cross section. When the pot is reversed the solid residue falls out in one piece.

As shown in Figs. 21 and 22 the retorts or pots may be struck up out of sheet steel and formed of two halves 51, 51 welded together at their abutting edges 52 as in Fig. 21 or they may be made of three sections, to wit, the longitudinal sections 53, 53, and an end or bottom section 54, as in Fig. 22. The upper edge of the annulus 46 of each bucket is preferably grooved or depressed as at 55 to receive an annular rib 56 of similar cross section formed upon the cast metal top 58 whereby a close joint between said top and annulus is effected. In order to secure the top of the pot, pairs of ears 59 are formed at suitable intervals about the top and projecting above the same between which ears are pivoted plates 60 (see Fig. 20) by means of bolts 61 passing through slots 62 in said plates. The plates are also formed with perforations 63, which when the cover is in place on the pot project between lugs 64 at the upper ends of the straps 48 and are pivoted to said straps by pins 65 extending through perforations in said ears and through holes 63. At their outer ends latch plates 60 are also formed with openings 66 to which links 67 are pivoted by bolts 68, said links forming a part of the supporting means for said covers or receptacles as hereinafter described. It is to be observed that the weight of the cover and pot suspended from these links forces the inner ends of plates 60 downwardly against the cover, slots 62 permitting the necessary play and therefore the cover is maintained in the closest possible contact with the annulus 46 during the coking operation. Four of the angle straps 48 are provided with the ears above described for the plates 60 but intermediate straps 48$^a$, 48$^b$ which secure the flange and annulus together are without such lugs but straps 48$^a$ are formed with outwardly-extending ears 72 perforated at 73 for a purpose which will appear. Cover 58 is also formed with a filling opening 74 and plug 75 and with an outlet nozzle 76 which receives the end of gooseneck 77 by which the volatile products are coveyed to the trough for receiving them described below.

As heretofore observed these pots or retorts are traversed along the passage 26 with their flanges substantially in contact with packing plates 36 at the sides and with the similar flanges of adjoining pots. Thus the escape of the hot gases and products of combustion from the passage through the top thereof is substantially prevented. In order to substantially prevent the escape of products of combustion from the entrance end of the passage the latter is formed for a distance to accommodate two successive pots into a narrow trough 78 of a cross section to substantially fit against the bodies of the pots passing therethrough (see Fig. 10$^a$) which thus block the outward passage of the hot products of combustion through said end of the passage and because of the length of the constricted end of the passage and the manner of feeding the pots, at least one pot is always blocking said constricted end. A downwardly directed flue 79 communicates with the passage 26 adjacent the constricted end thereof and merges into a horizontal flue 80 connected to a riser 81 by which the products of combustion and gases are carried to a heating chamber 82 surrounding the supply tank 83 for the pitch. The tank 83 is spaced from the walls of said chamber by brick-work 84 to permit the passage of gases around said tank and the chamber is connected by a short flue 85 with the stack 28, a damper 86 in the last said flue serving to control the escape of the products of combustion. By the construction just described I have provided for the entrance of the pots into the passage 26 without the escape of the heating gases which are carried through flues 79, 80 and 81 to the chamber for maintaining the supply of pitch in a sufficiently heated condition to insure the required fluidity, thus substantially using all the heat generated in the fire-box.

The hot products of combustion and gases are prevented from escaping and air from entering at the exit end of the passage not only by a similar construction of said passage to fit the pots as at 87 (see Figs. 3$^c$ and 10) but by a door or shutter 88 which further seals the opening. The door is mounted in a metallic continuation of said passage comprising slatted metal side walls 89 continuing the brick side walls of the furnace and a bottom 90, said walls and bottom being supported on suitable uprights 91 raised upon th cement or other foundations 92. Said door is pivoted at 93 between the side walls and counterweighted at 94 and shaped as shown in Fig. 10 so that it yields when a receptacle is pressed against it but coöperates with said receptacle in maintaining the seal of the passage at that end until the receptacle is carried out of contact therewith. The manner of pivoting the door is shown in detail in Fig. 26, said door being secured to a shaft 95 by means of brackets 96. Uprights 91 are braced by members 97 connected thereto and to the cross-beam 98 secured to the foundations of the furnace. It will be obvious that as each receptacle is carried against the door by the means to be presently described, the door yields until the receptacle passes beyond it and then resumes its normal position, closing the end of the passage. By the described construction waste of the hot gases is substantially prevented and furthermore access of air to the heating chamber is avoided and thus the atmosphere of the chamber maintained neutral or reducing, avoiding or retarding the destruction of the pots by oxidation.

The pots or retorts are supported each by its own trolley running upon an endless track 99 (see Figs. 1ª, 1ᵇ, 3ª, 3ᵇ, 3ᶜ) one side of the loop thereof extending immediately above the center of the passage of the furnace. As shown in Fig. 4 the furnace is sheltered by a roof 100, the supports 101 for one side thereof also constituting supports for the transverse beams 102 by which said track is carried. The track is supported on I-beams 103, and trolleys 104 (see Fig. 28), which carry the respective retorts or pots, are each supported on the track by trucks 105 which are pivoted at 106 to the opposite ends of each said trolley and provided with rollers 107 shaped to engage the track. By pivoting the trucks the wheels thereof are enabled to follow the track about the turns thereof. Each trolley at its opposite ends is provided with a depending angular member 107ª rigidly secured thereto, the laterally bent ends 108 of which members engage and support a bridge bar 109 which extends immediately below and parallel to the track. From these bridge members the pots and their respective covers are supported. As seen in Fig. 27 a pair of transverse members 110, 111 are secured to the bridge bar, member 110 being rigidly secured thereto and member 111 pivoted thereto at 112, and both members bent at an angle of 45 degrees at their ends as at 113, and perforated at 114 to receive the supporting members for the respective pots. As heretofore stated the pivoted plates 60 of which there are four to each pot and cover are suspended by pairs of links 67. Each pair of links is connected to a turn-buckle 115, the upper end of which carries a hook 116 and the four hooks of each pot are inserted in the corresponding holes 114 in the transverse member carried by the corresponding trolley. By reason of the transverse member 111 being pivoted the pot is evenly sustained notwithstanding slight variations in the lengths of the supporting links or members.

The trolleys may be fed along by hand or by any suitable mechanism. In the particular construction shown in the drawings I have employed an endless chain 117 immediately above the portion of the track by which the pots are carried through the furnace for propelling the trolleys through this portion of their course. The endless chain 117 is carried by sprockets 118, 119 and driven by sprocket 120 which in turn receives its motion from a motor 121 driving said sprocket through pinion 122 and gear 123. Each trolley carries a pivoted dog 124 journaled upon the longitudinal member 125 of said trolley which dog is so weighted that its end 126 normally projects upwardly into the path of the links of said chain to be engaged and driven thereby in one direction only, the dog yielding for relative motion between the trolley and chain in the other direction.

The several pots are suspended from the track by their respective trolleys except during the comparatively brief intervals during which they are dumped. After dumping in a manner to be presently described each pot is returned to its respective trolley and fed rearward on the limb of the loop of track at one side of the furnace until it comes into charging position at the entering end of the furnace passage adjacent the tank 83. The tank 83 has an outlet 127 with a movable spout 128 and controlled by a valve 129. As each receptacle or pot is brought into filling position the plug 75 is removed from the filling opening 74 and the spout 128 inserted in the latter and the desired amount of pitch run into the retort. The retort is then pushed by hand or otherwise into the entering end of the furnace passage, the dog on the trolley running under the chain until it is engaged by one of the links thereof. From this time the pot is slowly fed lengthwise of the furnace by the chain and its driving mechanism until, the coking operation having been completed, it arrives at the outlet end of the passage for dumping.

As shown more particularly in Fig. 3, the track is extended considerably beyond the end of the furnace so as to permit the pots to travel in a right line until they escape the door. After the door has been released each pot is fed forward by hand or otherwise disengaging the dog on the trolley from the chain and carried around the end of the loop into dumping position shown more particularly in Fig. 3ᶜ. Up to this point the pot is suspended from its trolley but it is now released therefrom by mechanism to be presently described and dumped and then returned to its trolley support. The dumping mechanism is best shown in Figs. 5 to 8, inclusive. It comprises a corset or harness 130

130 which receives the pots successively, supports them so that they may be disengaged from their respective covers and trolleys, dumps them and returns them to their covers and trolleys. Referring now to Figs. 7 and 8, in which the corset or harness is shown on a somewhat enlarged scale it will be seen that this apparatus comprises a vertical U-shaped member 131 of a shape roughly corresponding to a vertical section of the pots and formed of iron strap or bars riveted together, and a pair of horizontal U-straps 132, 133, rigidly secured thereto, the construction being such that the corset may be applied laterally to the respective retorts and the vertical U brought in substantially diametrical position thereon with the horizontal U's abutting against the exterior of the pot. The ends 134 of the vertical member of the corset are provided with inwardly projecting lugs 135, 136 which are spaced apart and perforated in register with each other, the perforations being so spaced that when the corset is in place upon a pot the perforations in the ears 135, 136 are in registry with the perforations 73 in the outwardly turned lugs 72 on said pot. I provide a pair of locking bars 137, 137 which are guided for vertical movement in guide lugs 138, 139, mounted on cheek-plates 140 on the respective ends of the vertical U member, the upper ends of rods 137 being turned over or reversed so that when said rods are in their lowered position as shown in Figs. 7 and 8, the reversed ends 141 enter the perforations in lugs 135, 136, and if the harness is in position on a pot said locking rods also project through the perforations in the lugs on said pot between lugs 135 and 136 thus securing the harness or corset to the pot. Springs 142 compressed between lugs 139 and collars 143 on said rods urge the latter toward their lowermost position and prevent accidental displacement thereof.

The harness thus described is suspended by ears 144 thereon and cables 145, the latter being so controlled that the harness may be raised or lowered to adjust it to a pot and moved laterally with respect thereto. The cables 145 which are two in number pass upward from the ears 144 and over sheaves 146, 146 to drums 147, 147 upon a transverse shaft 148. Said shaft is mounted in stationary bearings upon a frame 149 and carries at one end a worm wheel 150 which engages a worm 151 (see Fig. 6) upon a shaft 152 which also carries a bevel gear 153. The mechanism is driven from a motor 154 the shaft 155 of which carries bevel pinions 156, 157 which are shiftable together longitudinally of said shaft to throw either one or the other into engagement with the gear wheel 153 in an obvious and well-known manner to reverse the direction of rotation of the mechanism. The lateral position of the harness may be controlled by a cable 158 secured to the upper U 132 intermediate the ends thereof and passing over a sheave 159 to a drum 160 on a shaft 161 turned by a handle 162. By suitably operating the cables 145 and 158 the corset may be brought into proper engagement with the pot to be dumped and secured thereto by the engagement of the rods 131 with the lugs of said pot. When this has been accomplished the pot is slightly raised to transfer the weight thereof from the trolley and from the pivoted plates 60 and the pivot pins 65 are then withdrawn from the lugs 64 (see Figs. 17 and 18) whereby the pot is released from its cover and trolley. The pot is then lowered by means of the cables 145. In order to reverse the pot for dumping it I employ a pair of cables 163 which extend over sheaves 164, 164 to the larger drums 165, 165 upon the shaft 148, and are wound thereon in a direction the reverse of the winding of cables 145. The other ends of the cables 163 are secured to the eyes 166 attached to the respective upper ends of a pair of levers 167 pivoted at 170, 170 to the corset. Said levers are connected together at their opposite ends by a rod 168 and loop strap 169 respectively, to form a latch frame for holding the lower end of the pot in the corset during dumping, and are so overweighted that they normally occupy the position shown in dotted lines in Fig. 7 in which the strap loop 169 is lowered out of the way so that the corset may be readily applied to a pot to be dumped or removed therefrom. When, however, the cables 163 attached to the eyes 166 are tautened by revolving the shaft 148 in the proper direction, the levers swing about their pivots to bring the strap 169 against the pot which is thus tightly held in the corset and prevented from separating therefrom at its lower end. Further draft upon the cables 163, which is accompanied by a suitable slackening of the cables 145, transfers the weight of the pot to the former cables permitting it to reverse into the position shown in dotted lines in Fig. 6. It is desirable, however, to lock the swinging frame comprising the levers 167 when in the position to grasp the pot and for this purpose I have provided a pair of latch pins 171, which are slidably mounted in perforations in levers 167 and brackets 172 thereon and normally held in their inner positions by springs 173. The vertical loop 131 is provided with side plates 174 to which levers 167 are pivoted at 170 and the respective edges of which are engaged by said latch pins when the pivoted frame is in the position shown in full lines in Fig. 7 to avoid accidental displacement of the pivoted frame.

In order to take care of the volatile products given off during the coking process I provide alongside the passage for the pots or retorts a trough 175 into which the products of distillation are led. The trough as shown in Fig. 4 is generally rectangular in cross section and may extend throughout the length of the furnaces being provided with the end walls 176, 177. (See Figs. 11ª, 11ᵇ.) Intermediate the ends of the trough and extending through the portion thereof corresponding to that portion of the travel of the retorts during which distillation occurs, the trough is provided with a hood 178 which is in the shape of an inverted U in cross section, (see Fig. 13) the lower edges of the hood dipping beneath the liquid which is maintained in the trough. The hood is supported from the cross beams 102 which carry the track for the retort trolleys by suspension rods 179 connected to cross pieces 180 which are attached to the hood, the upper ends of said links or suspension rods being connected to clamps 181 which embrace the lower edges of the respective beams and the trough is maintained in proper lateral position by spacing bar 182 connected to uprights 101. The gases and vapors from the pitch are conveyed from the retorts to said trough and hood by the goose-necks 77 of which there is one for each retort cover attached to the outlet 76 thereof. The first joint 77ª of the goose-neck is inclined upwardly from the cover and adapted to extend to a point above the upper edge of the adjacent wall of the trough when the retort with the cover thereon is in position in the passage of the furnace, and at its upper end is provided with a horizontal swivel connection 183 by which it connects to the depending member 184 of said goose-neck. The latter is of a length to reach beneath the surface of the liquid in the trough where it carries a shoe 185 which extends under the edge of the hood as at 186. (See Figs. 23, 24). The shoe is in the form of an inverted shallow trough curved in cross section, closed at one end by an end wall 187 and open at the other end 188 beneath the hood.

In order to get the goose-neck into the trough over the end of the latter and to guide it beneath the hood I provide within the trough a pair of guides 189, 190, the lower of which extends over the opposite ends of the trough at 191, 192. At the entering end of the trough the guide 190 is extended beyond the trough and curved downward as at 193, so that when the shoe on the goose-neck approaches the trough it strikes the inclined end of the guide and the depending section of the goose-neck turns upon the swivel joint previously described permitting the shoe to ride upon the guide and down into the trough. Beneath the hood the guide 190 is substantially horizontal and beyond the hood toward the exit end of the trough the guide again inclines upwardly to turn the depending section of the goose-neck into position to escape the end wall 177 of the trough. The guides 189, 190 may be supported in any suitable manner and are shown as suspended from the convenient cross beams 102 by the uprights 194 (see Figs. 14, 15) to which they are attached by suitable brackets 195, 196. Within the trough the guides may be supported from the walls of the latter by the brackets 197. (See Fig. 12.) The upper guide 189 extends from the lower inner edge of the forward end of the hood a short distance toward the entering end of the trough, the forward end of said guide being upwardly inclined at 198 to ease the shoes into position between the parallel portion of guides 189, 190. It is important in order to prevent back pressure on the gases and vapors which would cause leakage that the depending end of the goose-neck and the shoe be immersed as little in the liquid as is consistent with conveying the products under the edge of the hood. The adjacent edge 199 of the hood is therefore somewhat higher than the more remote edge 200 thereof, and provided with an outwardly turned flange 201 against which the shoe bears, and the latter is maintained in close contact with said flange by means of a foot 202 loosely bolted to a cross piece 203 within the hood and depressed at its free end by a spring 204 intermediate the end of said foot and said cross piece. The spring surrounds a bolt 205 extending through openings in said foot and cross piece. The foot 202 bears on the lower guide 190 and the pressure of the spring is sufficient to maintain the shoe against the lower edge 186 of the hood. The distillates in the trough may be maintained at the desired level by properly locating the overflow 206 from the trough, and vapor pressure within the hood is avoided by means of the drop-off pipe 207 which receives the mixture of uncondensed vapors and fixed gases and leads it to a condenser 208 in which the vapors are condensed and separated from the fixed gases. The latter alone or together with any desired amount of the vapors may be used for firing the furnaces or for any other purpose.

The operation of the apparatus has been substantially described in connection with the description of its construction. A brief résumé of the operation may be given as follows: The pots prior to their entries into the heating passage are successively filled to the proper level from the tank. Necessarily the unheated cover projecting beyond the passage and exposed to the atmosphere provides a cooling instrumentality. It is necessary to offset the cooling effect of the cover sufficiently to raise the temperature of the surface of the pitch to that at which it may ultimately coke, and therefore the pots are not completely filled but only to such a level as will leave a heating area of side wall above the level of the pitch which will counteract the cooling effect of the cover and coke the pitch. Each pot as it is filled is carried forward around the bend into the heated passage, the pots being so crowded that their flanges are in contact so that one of the pots always forms an obstacle to the passage of the heating gases through the constricted entering end of the passage. As soon as the pot enters the passage its trolley is in position to be engaged by the constantly moving endless chain which thereafter moves the pot forward until it reaches the exit end of the heating passage and pushes past the door which yields under its pressure and comes opposite the corset of the dumping mechanism. The corset is then applied to the pot, the pot detached from its cover by removing the pins 65 and the pot then dumped in the manner heretofore described. After the pot has been reversed and the charge dropped therefrom, the pot is swung back in position and attached to its cover and then again carried by its trolley and pushed by hand or otherwise to the filling tank where it is again filled and the operation repeated.

It will now be apparent that by slowly feeding the pots along the passage 26 therefor they are exposed to a slowly but constantly rising temperature. Thus the action on the contents of the pots at any particular time is substantially uniform throughout and objectionable foaming and boiling of the pitch is prevented and opportunity is given the various volatile components to slowly volatilize and escape substantially at their respective points of volatilization without the breaking up which is ordinarily due to overheating, so that the more valuable components are not destroyed but are collected for further treatment. Furthermore, by thus slowly increasing the temperature of the mass in each pot coking of the outer layers is retarded until substantially the whole is approaching the coking point. This is important from an economical point of view because the rigid vesicular coke is a very poor conductor of heat compared to the pitch in its molten condition and the heat therefore may be conveyed to the inner portions of the mass more readily by maintaining the exterior portions as long as possible in a semifluid condition. By the careful exclusion of oxygen from direct contact with the heated pots oxidation and destruction of the latter are retarded.

I claim:

1. A process for coking pitch which consists in charging pitch into a series of receptacles, moving the receptacles successively through a progressively heated passage from the cooler to the hotter end thereof and successively discharging the receptacles of their pitch.

2. An apparatus for coking pitch comprising a passage, means for differentially heating the passage, a series of pots movable longitudinally of the passage, said pots being closed to the heating gases within the passage and provided with means for effecting discharge of distillate, means for charging said pots with pitch and for moving them through the passage, and means for successively discharging the pots.

3. An apparatus for coking pitch comprising an elongated passage, means for supplying said passage at one end with hot products of combustion, means for withdrawing the hot products of combustion from the other end of the passage, a series of pots movable longitudinally of the passage, individual covers for the respective pots, means for conducting away from the pots the products of volatilization, means for charging said pots with pitch and for moving them through the passage.

4. An apparatus for coking pitch, comprising a furnace having an elongated passage therethrough, a series of pitch pots closed to the heating gases in the passage and provided with means for effecting discharge of distillate, means for supporting the pots in the passage and traversing them along the passage, a fire-box at one end of said passage, and a flue for the escape of products of combustion at the other end of the passage.

5. An apparatus for coking pitch, comprising a furnace having an open-ended open-top passage, a fire-box communicating at one end thereof, an outlet flue communicating at the other end thereof, and a series of pots closed to the heating gases in the passage and provided with means for effecting discharge of distillate and adapted to be traversed along the passage and to close the open top thereof.

6. In an apparatus of the class described, an open-ended, open-topped passage, a series of pots adapted to receive pitch and to be traversed along the passage, a fire-box, a flue beneath the passage communicating with the fire-box at one end and with the passage at intervals and at its other end, to provide a gradually increasing temperature along said passage, and a flue for withdrawing the products of combustion from the passage.

7. In an apparatus of the class described, a horizontal passage open at the top and at its ends, means for heating the passage, a series of pots adapted to travel through the passage, means for supporting said pots, means for traversing them when supported along the passage, means on said pots for closing the top of the passage, and means for supplying said passage with heat.

8. In an apparatus of the class described, a horizontal passage having closed sides and bottom but open top, means for heating the passage, a series of pots, means for supporting the pots for travel within the passage, means continuously moving the pots along said passage, means for charging the pots with pitch, and means for maintaining the ends of the passage normally closed to prevent the escape of heated gases.

9. In an apparatus of the class described, a horizontal passage closed at both sides and at the bottom, means for supporting a series of receptacles in the passage, means for supplying heated gases to the passage adjacent one end thereof, means for withdrawing such gases adjacent the other end of the passage, a series of pots adapted to be fed along the passage, said pots being provided with coöperating means for substantially closing the top of the passage.

10. In an apparatus of the class described, a horizontal passage having closed sides and bottom, a series of pots adapted to be moved progressively along the passage, said passage intermediate its ends being of a size to permit the free passage of heated gases about the pots, and at its ends of a size and conformation to substantially fit the pots to prevent the passage of heated gases about the same, means adjacent one end of the passage for supplying it with heated products of combustion, and a flue communicating with said passage adjacent its opposite end for withdrawing the products of combustion.

11. In an apparatus of the class described, a horizontal passage having closed sides and bottom and an open top, a series of pots, means for supporting the pots in the passage along which they may be progressively fed, the passage being of such transverse dimensions intermediate its ends as to permit the free circulation of heated gases to the pots but constructed at its ends to substantially fit the transverse section of the pots, means for supplying heated products of combustion near one end of the passage and withdrawing them adjacent the other ends, the pots being provided with coöperating flanges to substantially close the top opening of the passage.

12. In an apparatus of the class described, a horizontal passage having closed sides and bottom and an open top, a series of pots, means for supporting the pots in the passage along which they may be progressively fed, the passage being of such transverse dimensions intermediate its ends as to permit the free circulation of heated gases about the pots but constructed at its ends to substantially fit the transverse section of the pots, means for supplying heated products of combustion near one end of the passage and withdrawing them adjacent the other end, the pots being provided with coöperating flanges to substantially close the top opening of the passage, strips extending along the tops of the side walls of the furnace and adapted to be adjusted toward the pots and to coöperate with the flanges thereof to seal the top opening of the passage.

13. In an apparatus of the class described, a horizontal passage having closed sides and bottom and an open top, a series of pots, means for supporting the pots in the passage along which they may be progressively fed, the passage being of such transverse dimensions intermediate its ends as to permit the free circulation of heated gases about the pots but constructed at its ends to substantially fit the transverse section of the pots, means for supplying heated products of combustion near one end of the passage and withdrawing them adjacent the other ends, the pots being provided with coöperating flanges to substantially close the top opening of the passage, sectional strips extending along the tops of the side walls of the furnace and adapted to be adjusted toward the pots and to coöperate with the flanges thereof to seal the top opening of the passage.

14. In an apparatus of the class described, a passage having closed side walls and bottom, means for movably supporting a series of pots within the passage, means for supplying the passage with heated gases and withdrawing the gases therefrom, and means for progressively moving the pots through said passage.

15. In an apparatus of the class described, a passage having closed bottom and side walls, means for heating the passage, a series of coking pots, a support for the pots above the passage and along which the pots are movable longitudinally of the passage, trolleys by which the pots are suspended from said support, a chain movable longitudinally of the passage and arranged adjacent the said support, and means for connecting the trolleys to the chain.

16. In an apparatus of the class described, a passage having closed bottom and side walls, means for heating the passage, a series of coking pots, a support for the pots above the passage and along which the pots are movable longitudinally of the passage, trolleys by which the pots are suspended from said support, a chain movable longitudinally of the passage and arranged adjacent the said support, and means for connecting the trolleys to the chain permitting the advance of the trolleys with reference to the chain but preventing the lagging thereof.

17. In an apparatus of the class described, a passage, means for heating the passage, a series of pots for containing pitch to be coked, movable along the passage, means for supporting and moving the pots along the passage, a trough extending along the passage, and means for conveying gases and vapor from the pots to said trough.

18. In an apparatus of the class described, a passage having closed side walls and bottom, a series of pitch pots, means for supporting and moving said pitch pots along the passage, an extension formed on the passage at one end thereof and a door in said extension pivoted at its bottom to normally close the passage and counterbalanced to yield to the movement of the pitch pots past it, and then to close the passage.

19. In an apparatus of the class described, a passage having closed bottom and side walls, a series of pitch pots, means for supporting and moving said pitch pots through the passage, a tank for maintaining a supply of pitch, means for drawing the pitch from said tank into the several pitch pots, means for supplying the passage with heated products of combustion near one end thereof, a flue for conducting away the products of combustion near the other end of the passage, a heating chamber surrounding the supply tank with which the last said flue communicates, and means for conducting the products of combustion from said heating chamber.

20. In an apparatus of the class described, a passage having closed side and bottom walls, means for supplying said passage with heated products of combustion and for withdrawing such products therefrom, a series of pitch pots, an endless track, a portion of which extends immediately above said passage, trolleys on said track adapted to be connected to the respective pitch pots for supporting the same in the passage, an endless chain also mounted above the passage and means for engaging the trolleys to the chain and moving them along the passage, and means for driving said chain.

21. In an apparatus of the class described, a passage, means for heating the same, a series of pitch pots movable along the passage, an endless track extending partially above and longitudinally of said passage, trolleys on said track, means for supporting the respective pots from said trolleys, means for feeding the trolleys along the track, means located at the end of the passage for receiving and supporting the pots when disengaged from their respective trolleys, and means for dumping the pots.

22. In an apparatus of the class described, a passage, means for heating the same, a series of pitch pots movable along the passage, an endless track extending partially above and longitudinally of said passage, trolleys on said track, means for supporting the respective pots from said trolleys, means for feeding the trolleys along the track, a corset adapted to receive and support the several pots located at the outlet end of the passage, means for suspending the corset and for raising and lowering the same, and means for inverting the corset to dump the pot.

23. In an apparatus of the class described, a passage, means for heating the same, a series of pitch pots movable along the passage, an endless track extending partially above and longitudinally of said passage, trolleys on said track, means for supporting the respective pots from said trolleys, means for feeding the trolleys along the track, a corset for receiving and supporting the pot, means for locking the pot to the corset, means for supporting and raising and lowering the corset, and means for reversing the same to dump the pots.

24. In an apparatus of the class described, a passage, means for heating the same, a series of pitch pots movable along the passage, an endless track extending partially above and longitudinally of said passage, trolleys on said track, means for supporting the respective pots from said trolleys, means for feeding the trolleys along the track, a corset for receiving and supporting a pot, means for locking the pot to the corset, cables from which said corset is suspended attached to the upper end thereof and connected to a windlass, a cable attached to the lower end of the corset and adapted to support the same in a position to dump the pot contained therein.

25. In an apparatus of the class described, a track, a trolley on said track for supporting a pitch pot, said trolley comprising a bridge member, a pair of transverse bars on said bridge, one of such bars being stationary and the other pivoted to said bridge, and links connecting the outer ends of said bars to a pitch pot for supporting the same.

26. In an apparatus of the class described, a heating passage, a series of pitch pots adapted and arranged to be fed along the passage, a cover for each said pot, a trough arranged adjacent and parallel to the passage, and a conduit from each cover dipping into said trough to convey gases and vapors from the pot to the trough.

27. In an apparatus of the class described, a passage, means for supporting and moving pitch pots along the passage, pitch pots each having a cover, a trough arranged parallel to the passage, conduits for the gas and vapors of distillation connected to the respective covers of the pitch pots, and a hood within the trough there being means on each conduit to discharge the gases therefrom beneath the said hood.

28. In an apparatus of the class described, a heating passage, a series of pitch pots movable along the passage, a trough extending parallel to said passage, a cover for each pitch pot, a riser connected to each cover, a tubular section pivoted to each riser and dipping into the trough, a hood within the trough and extending longitudinally thereof, and means for guiding the pivoted section to lower it beneath the edge of the hood.

29. In an apparatus of the class described, a heating passage, a pitch pot, means for supporting the pitch pot and feeding it through said passage, a trough arranged parallel to said passage, a hood extending longitudinally of and within the trough, said trough being adapted to be filled with liquid above the lower edge of the hood, a cover for the pot, a tubular conduit pivoted to the cover and communicating with the interior of the pot, a shoe on the section adapted to extend beneath the edge of the hood in the trough and guides for lowering said shoe beneath the edge of the hood and for raising it beyond the same.

30. In an apparatus of the class described, an elongated horizontal chamber, means for continuously feeding a series of retorts to be heated along said chamber, a fire-box beneath the chamber at one end thereof, a flue extending beneath the chamber and communicating with the fire-box at one end and with the chamber at the other, a flue extending beneath the other end of said chamber and communicating with the same for carrying off the products of combustion therefrom.

31. In an apparatus of the class described, an elongated horizontal chamber, a series of pots, means for continuously feeding the pots along said chamber, a fire-box beneath one end of the chamber, a flue extending from said fire-box beneath the chamber and communicating therewith at its end and having also intermediate communication with the chamber, and a flue communicating with the other end of the chamber for carrying off products of combustion therefrom.

32. A metallic coking retort, for containing liquefiable carbonaceous materials during the coking thereof and for transmitting through its wall to such materials coking heat derived from a source extraneous to that of the retort, the wall of said retort having a rounded bottom, an elongated conical upper section and an intermediate section in which the curve of the bottom portion is merged into the conical surface, whereby the wall is resistant to deformation from the prolonged action of such coking heat and the weight of the material held in the retort; substantially as specified.

33. A metallic coking retort for containing pitch during the coking thereof and for transmitting through its wall to such pitch coking heat derived from a source extraneous to that of the retort, the wall of said retort having an approximately spherical bottom portion, a substantially conical upper portion and a curved intermediate portion merging the curve of the bottom portion into the conical surface of the upper portion whereby the wall is resistant to deformation from the prolonged action of such coking heat and the weight of the material held in the retort; substantially as specified.

34. In apparatus for coking liquefiable hydrocarbons, in combination: an elongated oven-chamber; movable coking retorts arranged to travel progressively within such chamber; furnace means to supply heat that diminishes in intensity along said chamber in direction reverse to the travel of said retorts; means for excluding air from said chamber; and discharge means for collecting the distillate gases from said moving retorts.

35. In a process of coking liquefiable hydrocarbons: conducting the distillation and carbonization of separate masses of the material individually while traversing the separate masses successively through heat whose intensity diminishes in countercurrent to the progressive movement of such individually coking masses.

36. A metallic coking retort, for containing liquefiable carbonaceous materials during the coking thereof and for transmitting through its wall to such materials coking heat derived from a source extraneous to that of the retort, the wall of said retort being substantially a catenary in vertical cross section, whereby the wall is resistant to deformation from the prolonged action of such coking heat and the weight of the material held in the retort; substantially as specified.

FRANZ PUENING.